(12) United States Patent
He et al.

(10) Patent No.: US 12,737,976 B2
(45) Date of Patent: Sep. 15, 2026

(54) METHOD FOR CONSTRUCTING STRUCTURAL SEMANTIC MAP UNDER UNDERGROUND WEAK-LIGHT AND LOW-TEXTURE ENVIRONMENT

(71) Applicant: Tongji University, Shanghai (CN)

(72) Inventors: Bin He, Shanghai (CN); Gang Li, Shanghai (CN); Feng Li, Shanghai (CN); Yulong Ding, Shanghai (CN); Bin Cheng, Shanghai (CN); Zhongpan Zhu, Shanghai (CN); Zhipeng Wang, Shanghai (CN)

(73) Assignee: Tongji University, Shanghai (CN)

( * ) Notice: Subject to any disclaimer, the term of this patent is extended or adjusted under 35 U.S.C. 154(b) by 186 days.

(21) Appl. No.: 18/770,446

(22) Filed: Jul. 11, 2024

(65) Prior Publication Data

US 2025/0022222 A1 Jan. 16, 2025

(30) Foreign Application Priority Data

Jul. 12, 2023 (CN) ........................ 202310857462.4

(51) Int. Cl.

| | |
|---|---|
| ***G06T 17/00*** | (2006.01) |
| ***G06T 5/20*** | (2006.01) |
| ***G06T 5/70*** | (2024.01) |
| ***G06T 7/13*** | (2017.01) |
| ***G06V 10/44*** | (2022.01) |

(52) U.S. Cl.
CPC ................ *G06T 17/00* (2013.01); *G06T 5/20* (2013.01); *G06T 5/70* (2024.01); *G06T 7/13* (2017.01); *G06V 10/44* (2022.01); *G06T 2207/20028* (2013.01)

(58) Field of Classification Search
CPC .. G06T 17/00; G06T 2207/20028; G06T 7/13
See application file for complete search history.

(56) References Cited

U.S. PATENT DOCUMENTS

| | | | | |
|---|---|---|---|---|
| 2019/0087959 | A1* | 3/2019 | Kitamura | A61B 1/00045 |
| 2021/0279852 | A1* | 9/2021 | Jakka | G06F 3/04815 |
| 2022/0114888 | A1* | 4/2022 | Napanda | G06V 20/584 |
| 2023/0380682 | A1* | 11/2023 | Bodnar | A61B 3/107 |

* cited by examiner

*Primary Examiner* — Matthew Salvucci
(74) *Attorney, Agent, or Firm* — Wood Herron & Evans LLP

(57) ABSTRACT

A method for constructing a structural semantic map under an underground weak-light and low-texture environment is provided. The method includes: fusing traditional methods with a parameter line detection and verification model of structural semantics of a Transformer; and establishing a geometric primitive half-plane search method guided by the direction of structural information. The method also includes establishing a neighborhood greedy expansion algorithm based on a geometric primitive model; and optimizing geometric primitive poses and boundaries one by one. The method further includes fusing a point cloud map with structural information, and establishing a semantic map with geometric structure primitives.

10 Claims, 5 Drawing Sheets

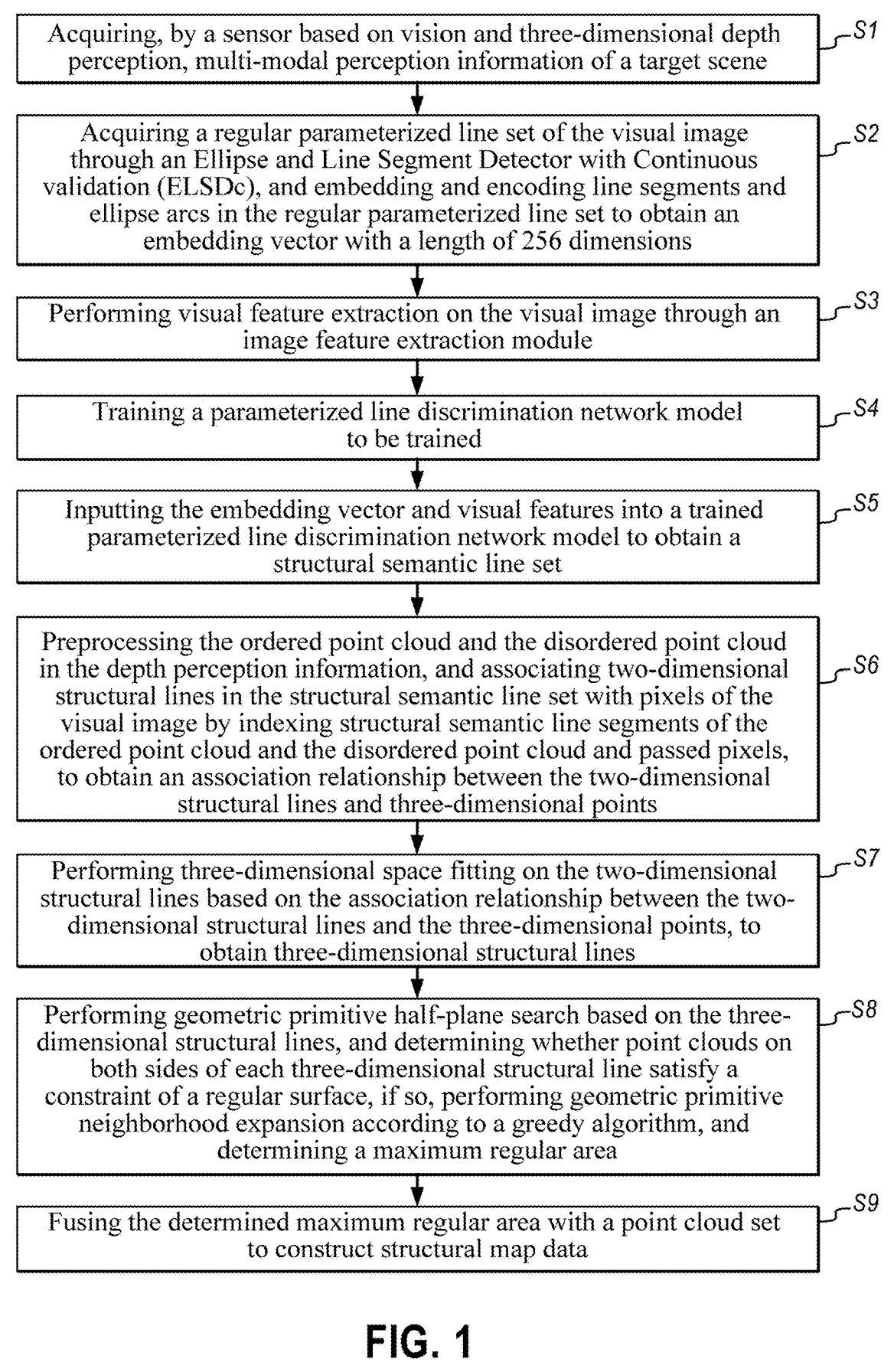

S1: Acquiring, by a sensor based on vision and three-dimensional depth perception, multi-modal perception information of a target scene S2: Acquiring a regular parameterized line set of the visual image through an Ellipse and Line Segment Detector with Continuous validation (ELSDc), and embedding and encoding line segments and ellipse arcs in the regular parameterized line set to obtain an embedding vector with a length of 256 dimensions S3: Performing visual feature extraction on the visual image through an image feature extraction module S4: Training a parameterized line discrimination network model to be trained S5: Inputting the embedding vector and visual features into a trained parameterized line discrimination network model to obtain a structural semantic line set S6: Preprocessing the ordered point cloud and the disordered point cloud in the depth perception information, and associating two-dimensional structural lines in the structural semantic line set with pixels of the visual image by indexing structural semantic line segments of the ordered point cloud and the disordered point cloud and passed pixels, to obtain an association relationship between the two-dimensional structural lines and three-dimensional points S7: Performing three-dimensional space fitting on the two-dimensional structural lines based on the association relationship between the two-dimensional structural lines and the three-dimensional points, to obtain three-dimensional structural lines S8: Performing geometric primitive half-plane search based on the three-dimensional structural lines, and determining whether point clouds on both sides of each three-dimensional structural line satisfy a constraint of a regular surface, if so, performing geometric primitive neighborhood expansion according to a greedy algorithm, and determining a maximum regular area S9: Fusing the determined maximum regular area with a point cloud set to construct structural map data

FIG. 1

METHOD FOR CONSTRUCTING STRUCTURAL SEMANTIC MAP UNDER UNDERGROUND WEAK-LIGHT AND LOW-TEXTURE ENVIRONMENT

CROSS-REFERENCE TO RELATED APPLICATION

This patent application claims the benefit and priority of Chinese Patent Application No. 202310857462.4 filed on Jul. 12, 2023, the disclosure of which is incorporated by reference herein in its entirety.

TECHNICAL FIELD

The present disclosure relates to the technical field of computer vision three-dimensional modeling, in particular to a method for constructing a structural semantic map under an underground weak-light and low-texture environment.

BACKGROUND

A three-dimensional spatial sensing technology based on one or more sensors such as LIDAR, a depth camera and an RGB camera has an important application prospect and an important market value in some fields such as scene modeling, robot navigation, robot target grasping, intelligent detection and digital twin. After years of exploration in the academic and industrial circles, the modeling method based on fusion of sensors such as vision and radar sensors has made great progress, but it is still difficult to operate stably in complex scenes such as underground space. The stereoscopic perception of the underground space is the key technical support for the applications such as urban intelligent governance, underground infrastructure perception in a battlefield environment and underground mine inspection. Therefore, it is of great practical significance to improve the scene modeling ability under the weak-light and low-texture environment.

At present, the scene modeling under the weak-light and low-texture condition depends on an expensive three-dimensional scanner, resulting in the problem of high cost. In addition, the point cloud obtained by three-dimensional scanning can establish a three-dimensional model of the scene even if the point cloud is post-processed by triangular patches, but the model lacks the identification and complete modeling of the regular structure in the scene. Obtaining a complete Computer Aided Design (CAD) model in key parts is of great significance to improve the visualization effect of the model, simplify the complexity of subsequent artificial aided modeling, and quickly implement related intelligent applications. Three-dimensional modeling with multi-sensor fusion is generally carried out in the following ways. First, robots or humans to carry sensing devices such as cameras, radars, inertial sensors, and depth cameras, move in the target scene, so as to collect multi-modal perception information with time synchronization in real time. After the collection, according to different types of combinations of the used sensors, different inter-frame data association algorithms are used to obtain the translation and rotation matrix between adjacent data frames. Moreover, the rotation and translation matrix can be optimized in a long sequence. Thereafter, the three-dimensional point cloud model of the scene is calculated through the rotation and translation matrix and the internal and external parameter matrices in the sensor. Finally, based on the three-dimensional point cloud model, a professional three-dimensional point cloud editing engineer carries out the steps such as triangulation meshing, manual editing and texture mapping to establish a three-dimensional scene CAD model.

Three-dimensional scene enhancement based on structure identification and regular geometric structure profiles has been studied and applied in related fields, which helps to implement three-dimensional CAD modeling and scene enhancement in complex scenes. However, there are still many shortcomings. On the one hand, in the context of the parameter extraction of structural semantic lines, most of the existing deep learning line segment detection algorithms do not distinguish between structural lines and texture lines, so that it is difficult to directly identify and enhance three-dimensional structures. No breakthrough has been made in how to characterize and learn different-dimensional structural semantic lines in a deep learning framework. On the other hand, in the modeling of regular geometric objects, a deep learning geometric primitive segmentation method based on point clouds needs a lot of computing resources, and the segmented point clouds still need to be fitted with geometric primitive parameters by using traditional methods. In addition, these methods fail to effectively integrate and utilize the image and point cloud data, while our human visual system can draw lines according to the geometric outline of the scene and effectively infer the three-dimensional structure of the scene.

SUMMARY

The embodiments of the present application provide a method for constructing a structural semantic map under an underground weak-light and low-texture environment and an apparatus thereof. The technical solution is further described below as follows.

On the one hand, the present disclosure provides a method for constructing a structural semantic map under an underground weak-light and low-texture environment, where the method includes the following steps:

- S1, acquiring, by a sensor based on vision and three-dimensional depth perception, multi-modal perception information of a target scene, where the multi-modal perception information includes a Red-Green-Blue (RGB) visual image and depth perception information, and the depth perception information includes an ordered point cloud and a disordered point cloud;
- S2, acquiring a regular parameterized line set of the visual image through an Ellipse and Line Segment Detector with Continuous validation (ELSDc), and embedding and encoding line segments and ellipse arcs in the regular parameterized line set to obtain an embedding vector with a length of 256 dimensions;
- S3, performing visual feature extraction on the visual image through an image feature extraction module;
- S4, inputting the embedding vector and visual features into a trained parameterized line discrimination network model to obtain a structural semantic line set;
- S5, preprocessing the ordered point cloud and the disordered point cloud in the depth perception information, and associating two-dimensional structural lines in the structural semantic line set with pixels of the visual image by indexing structural semantic line segments of the ordered point cloud and the disordered point cloud and passed pixels, to obtain an association relationship between the two-dimensional structural lines and three-dimensional points;
- S6, performing three-dimensional space fitting on the two-dimensional structural lines based on the association relationship between the two-dimensional structural lines and the three-dimensional points to obtain three-dimensional structural lines;

S7, performing geometric primitive half-plane search based on the three-dimensional structural lines, and determining whether point clouds on both sides of each three-dimensional structural line satisfy a constraint of a regular surface, if so, performing geometric primitive neighborhood expansion according to a greedy algorithm, and determining a maximum regular area; and

S8, fusing the determined maximum regular area with a point cloud set to construct structural map data.

In some embodiments, the acquiring a regular parameterized line set of the visual image through an ELSDc in S2 includes:

S21, acquiring the regular parameterized line set {L, A} of the visual image through the ELSDc, wherein {L, A} is shown in the following formula (1):

$$\{L, A\} = ELSDc\,(I_{rgb}) \tag{1}$$

$$L_i = \{(x_{1i}, y_{1i}, x_{2i}, y_{2i}) | i = 1, 2, \ldots\ N\}$$

$$A_i = \{(a_j, b_j, x_{1j}, y_{1j}, \theta_j, \varphi_j^{start}, \varphi_j^{end}) | j = 1, 2, \ldots\ M\}$$

where $I_{rgb}$ denotes the visual image, $(x_{1i}, y_{1i}, x_{2i}, y_{2i})$ denote parameters of the i-th line segment, $x_{1i}$ and $y_{1i}$ denote two-dimensional coordinates of one end point of the i-th line segment, $x_{2i}$ and $y_{2i}$ denote two-dimensional coordinates of another end point of the i-th line segment, N denotes the total number of line segments, $$(a_j, b_j, x_{1j}, y_{1j}, \theta_j, \varphi_j^{start}, \varphi_j^{end})$$

denote parameters of the j-th elliptical arc, $x_{1j}$ and $y_{1j}$ denote two-dimensional coordinates of a center point of the elliptical arc, $a_j$ and $b_j$ denote semi-axis lengths of long and short axes, respectively, $\theta_j$ denotes a rotation angle, $$\varphi_j^{start}$$

denotes a starting point angle, $$\varphi_j^{end}$$

denotes a ending point angle, and M denotes the total number of elliptical arcs (also referred to as ellipse arcs herein).

In some embodiments, the embedding and encoding line segments and ellipse arcs in the regular parameterized line set to obtain an embedding vector with a length of 256 dimensions in S2 includes:

S22, according to the following formula (2), using two different encoders, respectively, to embed and encode the line segments and the elliptical arcs, and after encoding, outputting a vector with a length of 256 dimensions:

$$F_L^i = LineEncoder(L_i) \tag{2}$$

$$F_A^i = ArcEncoder(A_i)$$

where LineEncoder( ) denotes a line segment position encoder, $L_i$ denotes the i-th line segment, ArcEncoder( ) denotes an arc position encoder, and $A_i$ denotes the i-th elliptical arc.

In some embodiments, the image feature extraction module is Resnet-50; and the performing visual feature extraction on the visual image through an image feature extraction module in S3 includes: inputting the visual image into the Resnet-50, performing position embedding on a scale of the visual image by using a sin position encoder and a cos position encoder, and splicing a position embedding vector with the visual image to obtain the visual features of the visual image.

In some embodiments, a parameterized line discrimination network model is a Transformer model; and a training process of the parameterized line discrimination network model includes: by using a differentiable renderer, with a discriminant probability as a transparency value and line parameters as line drawing constraints, performing L2-loss on a rendered image and a binary image semantically labeled by a real structure, to train the parameterized line discriminant network model.

In some embodiments, the preprocessing the ordered point cloud and the disordered point cloud in the depth perception information in S5 includes: for an optimal precision range of the sensor, preprocessing the depth perception information by using a pass-through filter and a conditional filter, and extracting an effective perception area of the sensor; for the ordered point cloud in the depth perception information, using a bilateral filter to denoise a surface of a spatial three-dimensional model; for the disordered point cloud in the depth perception information, using a Gaussian filter to perform smooth denoising; and for a cloud outlier, using a statistical filter for removal.

In some embodiments, the associating two-dimensional structural lines in the structural semantic line set with pixels of the visual image by indexing structural semantic line segments of the ordered point cloud and the disordered point cloud and passed pixels, to obtain an association relationship between the two-dimensional structural lines and three-dimensional points in S5 includes: for each structural line corresponding to the ordered point cloud, associating indexes of all pixel points passed by the structural lines with indexes of the line segments, and establishing a set of three-dimensional coordinate points covered by the line segments; for the disordered point cloud, using the sensor to calibrate a parameter, establishing a corresponding relationship between pixel points in an image coordinate system and three-dimensional points of the disordered point cloud, associating indexes of all pixel points passed by each structural line corresponding to the disordered point cloud with the indexes of the line segments, and establishing a set of three-dimensional coordinate points covered by the line segments.

In some embodiments, the performing geometric primitive half-plane search based on the three-dimensional structural lines, and determining whether point clouds on both sides of each three-dimensional structural line satisfy a constraint of a regular surface in S7 includes: for the line segments in the three-dimensional structural lines, using a plane and a cylindrical surface for performing parameter fitting at the same time on two parts on both sides of the line segment, and in a case that any part on both sides of the line segment conforms to a fitting of the plane or the cylindrical surface, determining that the point clouds on both sides of the line segment satisfy the constraint of the regular surface, in which, there are corresponding regular geometric primitives; and for the elliptic arcs in the three-dimensional structural lines, using the plane for performing parameter fitting on a part located inside the elliptic arc, and in a case that there is a three-dimensional point cloud distribution conforming to the plane, determining that the point cloud inside an arc satisfies the constraint of the regular surface, in which, the geometric primitive inside the elliptic arc is a plane; and for a part outside the elliptic arc, using the cylindrical surface for parameter fitting, and in a case that there is a three-dimensional point cloud distribution conforming to the plane, determining that the point cloud outside the arc satisfies the constraint of the regular surface, in which, the geometric primitive outside the elliptic arc is a cylindrical surface.

On the other hand, the present disclosure provides an apparatus for constructing a structural semantic map under an underground weak-light and low-texture environment, which is applied to the method for constructing the structural semantic map under the underground weak-light and low-texture environment, where the apparatus includes:

- an acquisition module, configured to acquire, by a sensor based on vision and three-dimensional depth perception, multi-modal perception information of a target scene, where the multi-modal perception information includes a Red-Green-Blue (RGB) visual image and depth perception information, and the depth perception information includes an ordered point cloud and a disordered point cloud;
- an embedding and encoding module, configured to acquire a regular parameterized line set of the visual image through an Ellipse and Line Segment Detector with Continuous validation (ELSDc), and embed and encode line segments and ellipse arcs in the regular parameterized line set to obtain an embedding vector with a length of 256 dimensions;
- a feature extraction module, configured to perform visual feature extraction on the visual image through an image feature extraction module;
- a discrimination module, configured to input the embedding vector and visual features into a trained parameterized line discrimination network model to obtain a structural semantic line set;
- an association module, configured to preprocess the ordered point cloud and the disordered point cloud in the depth perception information, and associate two-dimensional structural lines in the structural semantic line set with pixels of the visual image by indexing structural semantic line segments of the ordered point cloud and the disordered point cloud and passed pixels, to obtain an association relationship between the two-dimensional structural lines and three-dimensional points;
- a fitting module, configured to perform three-dimensional space fitting on the two-dimensional structural lines based on the association relationship between the two-dimensional structural lines and the three-dimensional points to obtain three-dimensional structural lines;
- a search module, configured to perform geometric primitive half-plane search based on the three-dimensional structural lines, and determine whether point clouds on both sides of each three-dimensional structural line satisfy a constraint of a regular surface, if so, perform geometric primitive neighborhood expansion according to a greedy algorithm, and determine a maximum regular area; and
- a fusion module, configured to fuse the determined maximum regular area with a point cloud set to construct structural map data.

On the other hand, an electronic device is provided, including a processor and a memory, where at least one instruction is stored in the memory, and the at least one instruction is loaded and executed by the processor to implement the above-mentioned methods for constructing the structural semantic map under the underground weak-light and low-texture environment.

On the other hand, a computer-readable storage medium is provided, where at least one instruction is stored in the storage medium, and the at least one instruction is loaded and executed by a processor to implement the above-mentioned methods for constructing the structural semantic map under the underground weak-light and low-texture environment.

The technical solutions provided by the embodiments of the present disclosure have the following beneficial effects.

Compared with the structure identification and enhancement method based on point cloud fitting, the present disclosure uses the image and point cloud information at the same time, and extracts the structural semantic lines as clues to discover regular structures. On the one hand, the present disclosure reduces the risk of inaccuracy in the huge amount of calculation from segmentation to fitting of point clouds. On the other hand, compared with a series of methods based on image feature points, according to the structural line identification and determination method provided by the present disclosure, various underground spatial three-dimensional maps can be established under the weak-light and low-texture environment without manual intervention, and a complete CAD operational model is established for regular objects such as pipelines, columns and stairs, so that the method can work well even in underground spaces with poor light and lack of texture, such as urban underground pipe corridors, subway underground tunnels and various weak-light and low-texture environments, and can solve the problems of a long manual modeling period, a low three-dimensional modeling precision under low-texture and weak-light and so on. In addition, through inter-frame structural line matching, the present disclosure can also be used for robot visual positioning and navigation under the low-texture and low illumination environment.

BRIEF DESCRIPTION OF THE DRAWINGS

In order to explain the embodiments of the present disclosure or the technical solutions in the prior art more clearly, the drawings that need to be used in the embodiments will be briefly introduced. Obviously, the drawings in the following description are only some embodiments of the present disclosure. For those skilled in the art, other drawings can be obtained according to these drawings without creative labor.

FIG. 1 is a flowchart of a method for constructing a structural semantic map under an underground weak-light and low-texture environment according to an embodiment of the present disclosure.

DETAILED DESCRIPTION

In order to make the above objects, features and advantages of the present disclosure more understandable, the present disclosure will be explained in further detail with reference to the drawings and detailed description hereinafter.

Figure 2:
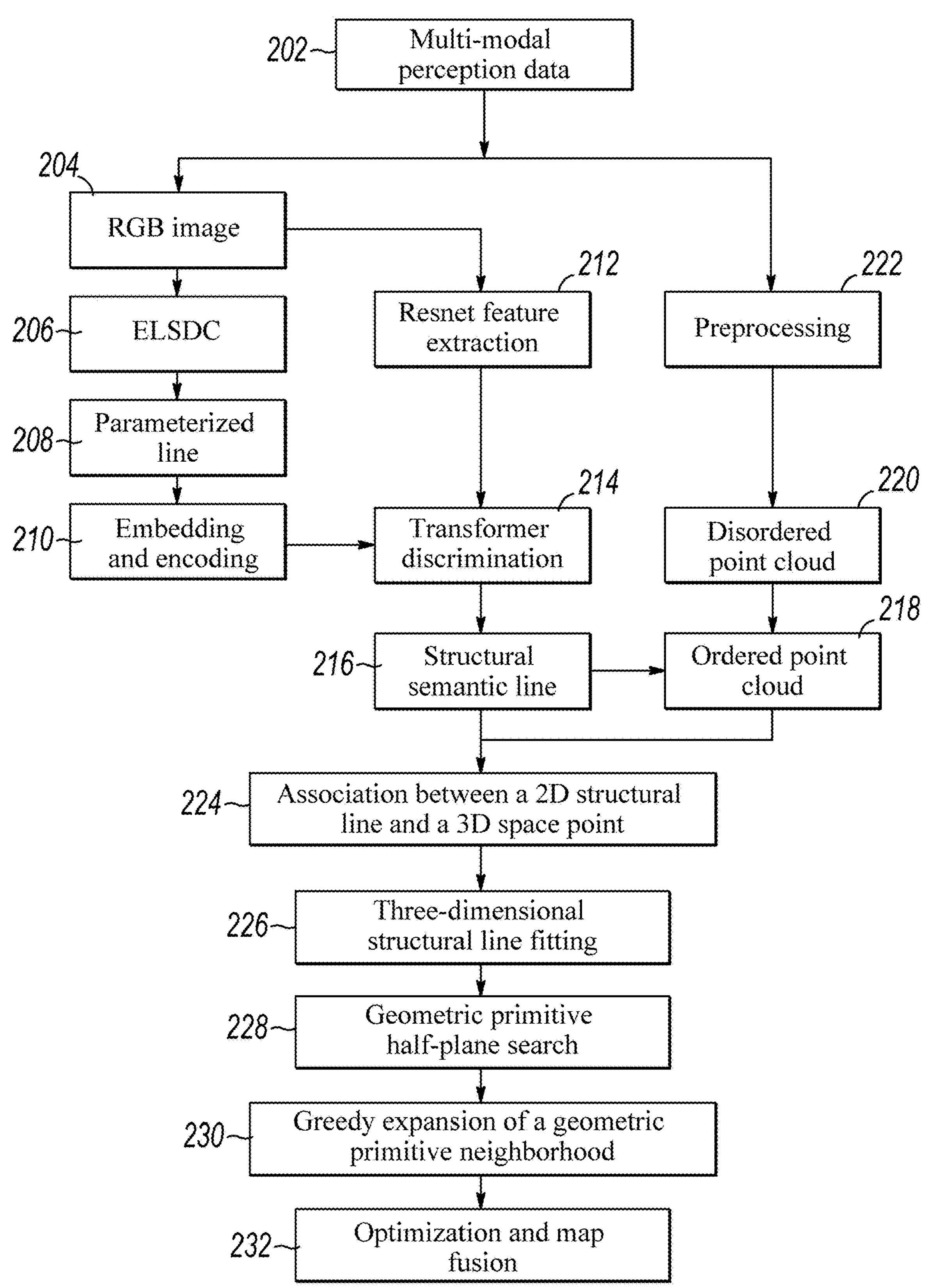
FIG. 2 is a flowchart block diagram of a method for constructing a structural semantic map under an underground weak-light and low-texture environment according to an embodiment of the present disclosure.

The embodiment of the present disclosure provides a method for constructing a structural semantic map under an underground weak-light and low-texture environment, which can be implemented by an electronic device. The electronic device can be a terminal or a server. In the flowchart of the method for constructing the structural semantic map under the underground weak-light and low-texture environment shown in FIG. 1 and the flowchart block diagram shown in FIG. 2, the processing flow of the method may include steps S1-S9.

In step S1, multi-modal perception information of a target scene is acquired by a sensor based on vision and three-dimensional depth perception.

The multi-modal perception information includes a Red-Green-Blue (RGB) visual image and depth perception information, and the depth perception information includes an ordered point cloud and a disordered point cloud.

In a feasible implementation, the sensor based on vision and three-dimensional depth perception can be constructed by one or more sensors such as LIDAR, a depth camera and an RGB camera. For example, the minimum sensor solution can be a single RGBD camera, which is suitable for the combination of the RGB camera and other auxiliary positioning sensor such as LIDAR. All sensors are required to be calibrated, including internal and external parameters.

In step S2, a regular parameterized line set of the visual image is acquired through an Ellipse and Line Segment Detector with Continuous validation (ELSDc), and the line segments and ellipse arcs in the regular parameterized line set are embedded and encoded to obtain an embedding vector with a length of 256 dimensions.

In some embodiments, the specific operation of S2 may include the following sub-steps S21-S22 (not separately shown in the Figures).

In step S21, the regular parameterized line set {L, A} of the visual image is acquired through the ELSDc, where {L, A} is shown in the following formula (1):

$$\{L, A\} = ELSDc\,(I_{rgb}) \tag{1}$$
$$L_i = \{(x_{1i}, y_{1i}, x_{2i}, y_{2i}) \mid i = 1, 2, \ldots N\}$$
$$A_i = \{(a_j, b_j, x_{1j}, y_{1j}, \theta_j, \varphi_j^{start}, \varphi_j^{end}) \mid j = 1, 2, \ldots M\}$$

where $I_{rgb}$ denotes the visual image, $(x_{1i}, y_{1i}, x_{2i}, y_{2i})$ denote parameters of the i-th line segment, $x_{1i}$ and $y_{1i}$ denote two-dimensional coordinates of one end point of the i-th line segment, $x_{2i}$ and $y_{2i}$ denote two-dimensional coordinates of another end point of the i-th line segment, N denotes the total number of line segments, $$(a_j, b_j, x_{1j}, y_{1j}, \theta_j, \varphi_j^{start}, \varphi_j^{end})$$

denote parameters of the j-th elliptical arc, $x_{1j}$ and $y_{1j}$ denote two-dimensional coordinates of the center point of the elliptical arc, $a_j$ and $b_j$ denote semi-axis lengths of long and short axes, respectively, $\theta_j$ denotes a rotation angle, $$\varphi_j^{start}$$

denotes a starting point angle, $$\varphi_j^{end}$$

denotes a ending point angle, M denotes the total number of elliptical arcs, and $A_j$ denotes the j-th elliptical arc.

In step S22, according to the following formula (2), two different encoders are used, respectively, to embed and encode the line segments and the elliptical arcs, and after encoding, a vector with a length of 256 dimensions is output:

$$F_L^i = LineEncoder(L_i) \tag{2}$$
$$F_A^i = ArcEncoder(A_i)$$

where LineEncoder( ) denotes a line segment position encoder, $L_i$ denotes the i-th line segment, ArcEncoder( ) denotes an arc position encoder, $A_i$ denotes the i-th elliptical arc, $$F_L^i$$

denotes a feature vector for the i-th line segment, and $$F_A^i$$

denotes a vector feature for the i-th elliptical arc.

In a feasible implementation, for line segment position encoding, rectangular frames, which are often used in the Transformer, is used for encoding, because the rectangular frames are similar in dimension and geometric meaning. For arc encoding, first, the minimum enclosing rotation rectangle of the arc segment is solved by arc parameters. The four coordinate points of the rotation rectangle, that is, eight parameters, are input as the arc encoder, which are also mapped into a 256-dimensional embedding vector.

In step S3, visual feature extraction is performed on the visual image through an image feature extraction module.

In some embodiments, the image feature extraction module may be Resnet-50. Based on the Resnet-50, the specific operation process of S3 can be as follows: inputting the visual image into the Resnet-50, performing position embedding on the scale of the visual image by using a sin position encoder and a cos position encoder, and splicing the position embedding vector with the visual image to obtain the visual features of the visual image.

In step S4, the parameterized line discrimination network model to be trained is trained.

In some embodiments, in order to design an end-to-end parameterized line discrimination network, the parameterized line discrimination network model can be set as the transformer model, and the line segments and elliptical arcs can be discriminated by using the transformer. The modeling, perceptual clustering and joint discrimination of the parameterized line can be realized through a whole "encoder-decoder", self-attention, joint query and inference.

The line segments and arcs are embedded and encoded as Query, the image features are used as Key, and a parameter line classifier is constructed by using the Transformer. When training the parameterized line discrimination network model based on the transformer, by using a differentiable renderer, with a discriminant probability as a transparency value and line parameters as line drawing constraints, L2-loss is performed on the rendered image and a binary image semantically labeled by a real structure. In order to avoid the workload of manually labeling different-dimensional parameter lines, based on the Barcelona Images for Perceptual Edge Detection (BIPED) dataset, the unstructured semantic lines are deleted by using an eraser tool through image editing software, and only the edges that conform to human visual perception experience and reflect the geometric structure of the scene are reserved for semi-supervised training of classifiers. Specifically, during the training, embedding of each structural line is scored by the classifier, and the score value is used as the transparency parameter. Combined with the line parameters, a differentiable renderer is used for rendering to obtain the predicted image, and L2 loss is performed on the predicted image and the true value of the edited BIPED real structural semantic line.

In step S5, the embedding vector and the visual features are input into a trained parameterized line discrimination network model to obtain a structural semantic line set.

Figure 3:
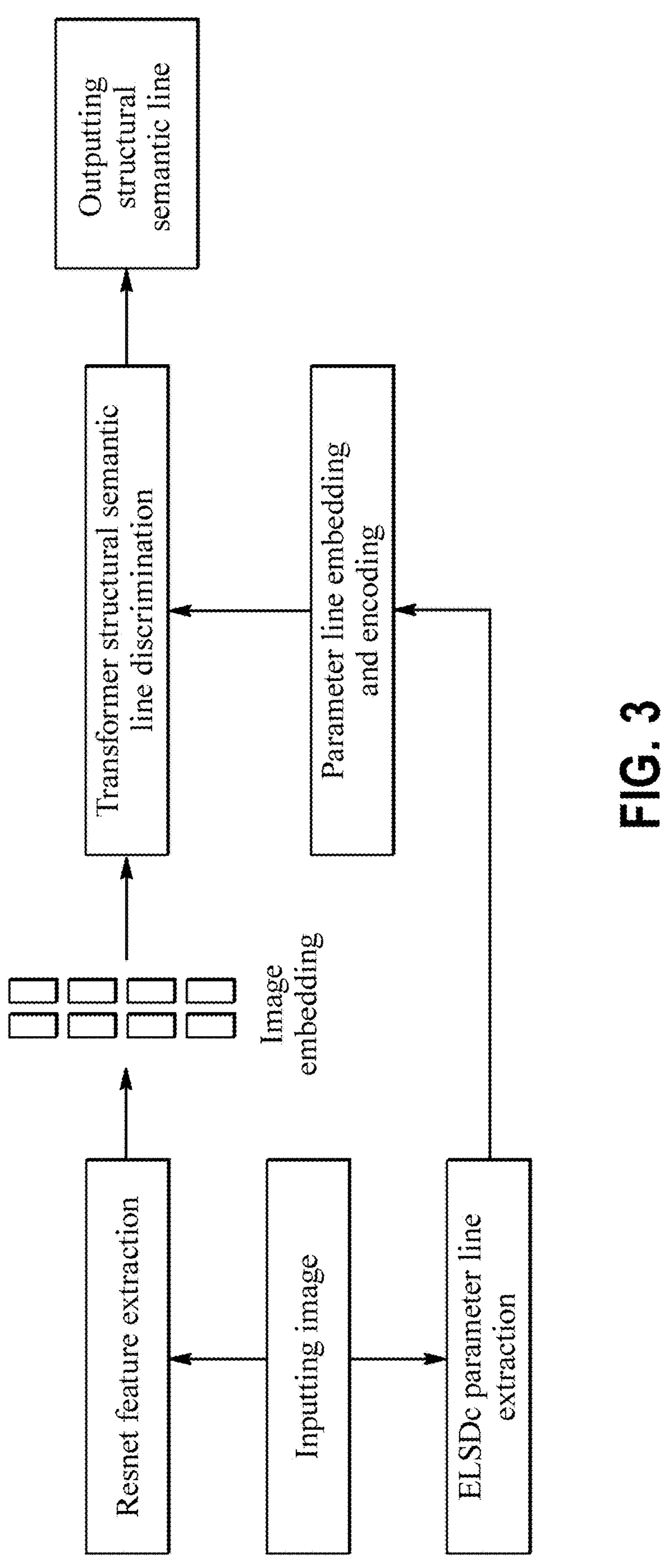
FIG. 3 is an architecture diagram of a parameterized line discrimination network model according to an embodiment of the present disclosure.

In a feasible implementation, the embedding vector obtained by embedding and encoding the line segments and the elliptic arcs (also referred to as ellipse arcs herein) is input into the trained parameterized line discrimination network model together with the visual features output by the Resnet-50, as shown in FIG. 3. It should be noted that, unlike the detection of ordinary parameter lines such as line segments or ellipses, the structural semantic lines in the embodiment of the present disclosure are the regular lines that reflect the three-dimensional structural changes of the scene, rather than regular structural lines resulted from texture changes, such as the boundary lines of flat walls rather than the texture boundaries resulted from graffiti on the walls.

In step S6, the ordered point cloud and the disordered point cloud in the depth perception information are preprocessed, and two-dimensional structural lines in the structural semantic line set are associated with the pixels of the visual image by indexing the structural semantic line segments of the ordered point cloud and the disordered point cloud and the passed pixels, so as to obtain the association relationship between the two-dimensional structural lines and the three-dimensional points.

In some embodiments, the specific operation of S6 may include the following sub-steps S61-S64 (not separately shown in the Figures).

In step S61, for an optimal precision range of the sensor, the depth perception information is preprocessed by using a pass-through filter and a conditional filter, and an effective perception area of the sensor is extracted.

In a feasible implementation, when acquiring distance information such as point clouds and depth, some noise points will inevitably appear in point cloud data due to the influence of device accuracy, operator experience and environmental factors. The function of filtering is to eliminate outlier data by using the low frequency characteristics of data, and smooth the data or extract the characteristics of specific frequency bands. For the optimal precision range of the sensor, preprocessed is performed by using the pass-through filter and the conditional filter, and the effective perception area of the sensor is extracted.

In step S62, for the ordered point cloud in the depth perception information, a bilateral filter is used to denoise a surface of a spatial three-dimensional model; for the disordered point cloud in the depth perception information, a Gaussian filter is used to perform smooth denoising; and for a cloud outlier, a statistical filter is used for removal.

In a feasible implementation, for the ordered point cloud, the bilateral filter is used to denoise the surface of the spatial three-dimensional model, which can maintain the geometric feature information in the point cloud data and avoid excessive smoothness of the three-dimensional point cloud data. For the unordered point cloud, the Gaussian filter is used to perform smooth denoising. Finally, the statistical filter is used to remove the cloud outlier.

In step S63, for each structural line corresponding to the ordered point cloud, the indexes of all the pixel points passed by the structural lines are associated with the indexes of the line segments, and a set of three-dimensional coordinate points covered by the line segments is established.

In step S64, for the disordered point cloud, the sensor is used to calibrate the parameter, a corresponding relationship between pixel points in an image coordinate system and three-dimensional points of the disordered point cloud is established, the indexes of all the pixel points passed by each structural line corresponding to the disordered point cloud are associated with the indexes of the line segments, and a set of three-dimensional coordinate points covered by the line segments is established.

In a feasible implementation, the depth perception information is preprocessed and associated with the image pixels, and a one-to-one mapping between the pixel space points and the three-dimensional space points is established. This step is carried out through the calibration parameters of the sensor system. The three-dimensional coordinate indexes corresponding to those of the two-dimensional pixel points that cannot be mapped are denoted as Nan. When preprocessing depth data, the data is truncated first according to the effective working range of the sensor, and then the point cloud is denoised by the bilateral and Gaussian filters. If the number of three-dimensional points and two-dimensional pixel coordinates that can establish the corresponding relationship is K, the corresponding relationship between the two-dimensional point $Pp_{xy}(i)$ and the three-dimensional point $P_{xyz}(i)$ can be established by calibrating the system parameter M by the sensor:

$$p_{xy}(i) = M \cdot P_{xyz}(i);\ \ i = 1, 2, \ldots K$$

In step S7, three-dimensional space fitting is performed on the two-dimensional structural lines based on the association relationship between the two-dimensional structural lines and the three-dimensional points to obtain three-dimensional structural lines.

In step S8, geometric primitive half-plane search is performed based on the three-dimensional structural lines, and it is determined whether the point clouds on both sides of each three-dimensional structural line satisfy a constraint of a regular surface, if so, geometric primitive neighborhood expansion is performed according to a greedy algorithm, and a maximum regular area is determined.

In some embodiments, performing geometric primitive half-plane search based on the three-dimensional structural lines, and determining whether the point clouds on both sides of each three-dimensional structural line satisfy a constraint of a regular surface in S8 includes the following specific operation: for the line segments in the three-dimensional structural lines, using a plane and a cylindrical surface for performing parameter fitting at the same time on two parts on both sides of the line segment, and if any part on both sides of the line segment conforms to the fitting of the plane or the cylindrical surface, determining that the point clouds on both sides of the line segment satisfy the constraint of the regular surface, that is, there are corresponding regular geometric primitives; and for the elliptic arcs in the three-dimensional structural lines, using a plane for performing parameter fitting on the part located inside the elliptic arc, and if there is a three-dimensional point cloud distribution conforming to the plane, determining that the point cloud inside the arc satisfies the constraint of the regular surface, that is, the geometric primitive inside the elliptic arc is a plane; and for the part outside the elliptic arc, using the cylindrical surface for parameter fitting, and if there is a three-dimensional point cloud distribution conforming to the plane, determining that the point cloud outside the arc satisfies the constraint of the regular surface, that is, the geometric primitive outside the elliptic arc is a cylindrical surface.

Figure 4:
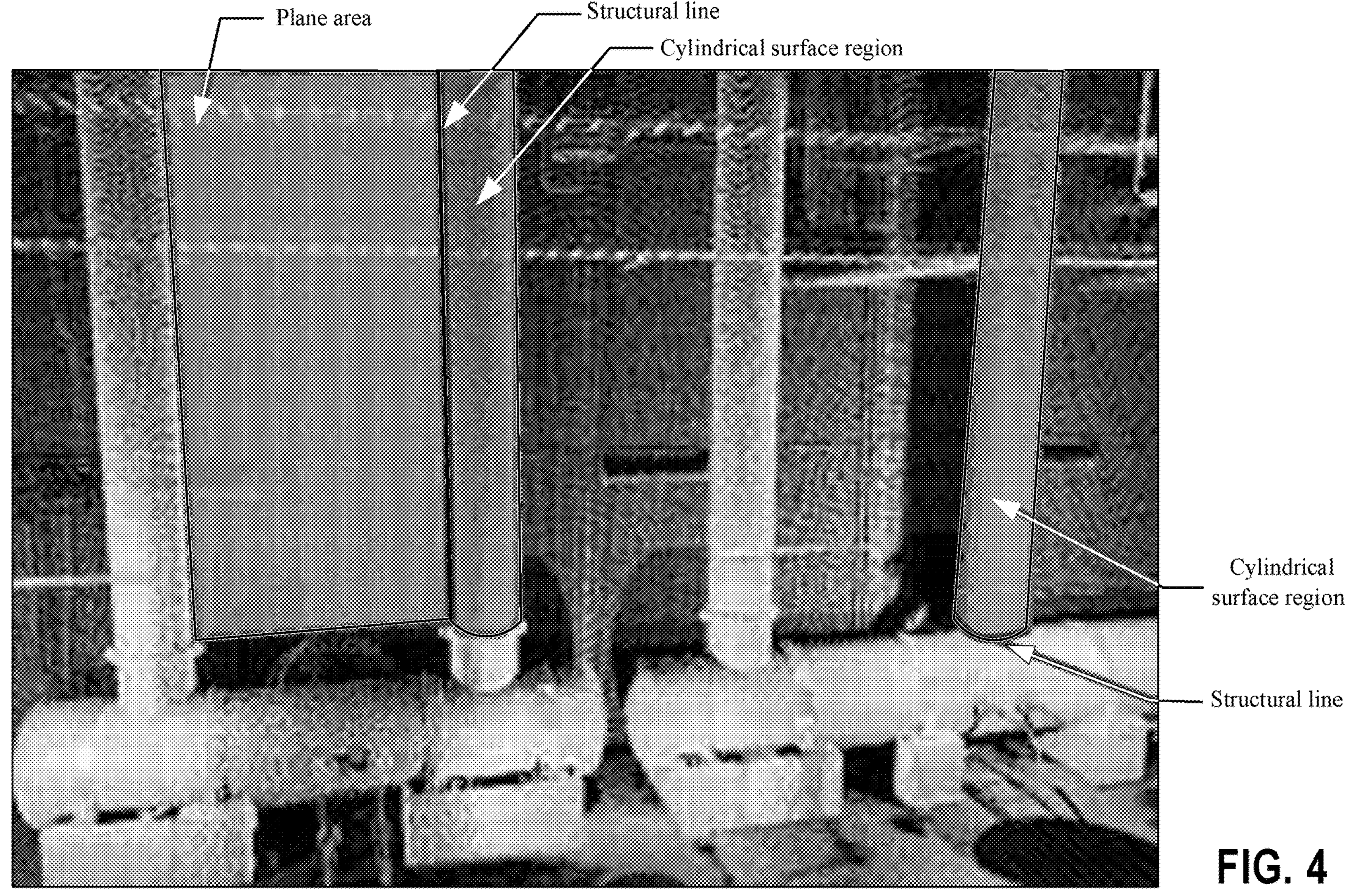
FIG. 4 is a picture on which a geometric primitive half-plane search method according to an embodiment of the present disclosure is applied.

In a feasible implementation, as shown in FIG. 4, the basic idea of geometric primitive half-plane search is to cluster continuous point clouds belonging to regular structural surfaces through the distribution of three-dimensional space on both sides of the structural semantic lines, so as to achieve the goal of fast structural primitive fitting. The basic operation is to preliminarily judge the types of surfaces on both sides by a multi-scale grid sampling method. For the candidate sides that satisfy the geometric constraints of the plane or the cylindrical surface, the best subset of points is selected from the point set containing gross errors according to the distance and minimum criterion to fit the initial value of a reliable model, and the gross errors are eliminated circularly by a robust Z-score method. The specific operation is as follows.

For the two geometric primitives of the plane or the cylindrical surface, with respect to the line segment, a line segment is defined to divide the area into two parts, that is, the upper half plane and the lower half plane. In these two parts, starting from the dividing line, the plane and the cylindrical surface are used to fit the parameters at the same time. If there is a geometric distribution conforming to one of them, it is considered that there are corresponding regular geometric primitives on the corresponding line segment side. For a two-dimensional arc, an arc is defined to divide the area into two parts, that is, the inner side of the arc and the outer side of the arc. On the inner side of the arc, starting from the dividing line, the plane is used to fit the parameters. If there is a three-dimensional point cloud distribution conforming to the plane, it is considered that the geometric model on the inner side of the arc is an existing plane. On the outer side, starting from the dividing line, the cylindrical surface is used to fit the parameters. If there is a three-dimensional point cloud distribution conforming to the cylindrical surface, it is considered that the geometric model on the outer side of the arc is a cylindrical surface.

In some embodiments, geometric primitive neighborhood expansion is performed according to a greedy algorithm, and a maximum regular area is determined, which can include the following specific operation.

The area judged as a regular semi-plane expands longitudinally in the direction of the line segment until the three-dimensional coordinates of the point cloud in the continuous area do not satisfy the geometric primitive model of the area.

In a feasible implementation, after determining the geometric primitive types on both sides of the geometric line, the greedy algorithm is used to expand the area. During the expansion, the expansion is carried out continuously from the inner side to the outer side. When encountering outliers that do not conform to the three-dimensional primitive model established by "geometric primitive half-plane search", the expansion stops in this direction until the search is completed in all directions. At this point, the index relationship belonging to the structural line is established for all three-dimensional points in the area.

It should be noted that if the point clouds on both sides of a three-dimensional structural line do not satisfy the constraints of regular surfaces, the point clouds will not be processed temporarily.

In step S9, the determined maximum regular area is fused with the point cloud set to construct structural map data.

In a feasible implementation, for all three-dimensional points belonging to the structural lines, the model parameters are optimized by using the least square method with the help of the type of the geometric primitives to which the three-dimensional points conform, such as the plane or the cylindrical surface. Finally the parameter geometric model belonging to this part is obtained. According to different purposes, a corresponding method for constructing a structural information map can be used. For example, by gathering the primitive parameters, the gathered primitive model is placed in the point cloud map through the rotation and translation matrix, which can realize structural visualization and support the task such as robot operation.

In the embodiment of the present disclosure (for example, the one shown in FIG. 2), multi-modal perception information 202 of a target scene is acquired; a regular parameterized line set 208 of the visual image 204 is acquired through the ELSDc 206; the line segments and ellipse arcs in the regular parameterized line set 208 are embedded and encoded 210 to obtain an embedding vector; visual feature extraction 212 is performed on the visual image through an image feature extraction module; the embedding vector and the visual features are input into a trained parameterized line discrimination network model 214 to obtain a structural semantic line set 216; the ordered point cloud 218 and the disordered point cloud 220 in the depth perception information are preprocessed 222, and two-dimensional structural lines in the structural semantic line set 216 are associated with the pixels of the visual image by indexing the structural semantic line segments of the ordered point cloud and the disordered point cloud and the passed pixels, so as to obtain the association relationship between the two-dimensional structural lines and the three-dimensional points 224; three-dimensional space fitting 226 is performed on the two-dimensional structural lines based on the association relationship between the two-dimensional structural lines and the three-dimensional points to obtain three-dimensional structural lines; geometric primitive half-plane search 228 is performed based on the three-dimensional structural lines, and it is determined whether the point clouds on both sides of each three-dimensional structural line satisfy a constraint of a regular surface, if so, geometric primitive neighborhood expansion is performed according to a greedy algorithm 230, and a maximum regular area is determined; and the determined maximum regular area is fused with the point cloud set to construct structural map data 232.

Compared with the structure identification and enhancement method based on point cloud fitting, the present disclosure uses the image and point cloud information at the same time, and extracts the structural semantic lines as clues to discover regular structures. On the one hand, the present disclosure reduces the risk of inaccuracy in the huge amount of calculation from segmentation to fitting of point clouds. On the other hand, compared with a series of methods based on image feature points, according to the structural line identification and judgment method provided by the present disclosure, various underground spatial three-dimensional maps can be established under the weak-light and low-texture environment without manual intervention, and a complete CAD operational model is established for regular objects such as pipelines, columns and stairs, so that the method can work well even in underground spaces with poor light and lack of texture, such as urban underground pipe corridors, subway underground tunnels and various weak-light and low-texture environments, and can solve the problems of a long manual modeling period, a low three-dimensional modeling precision under low-texture and weak-light and so on. In addition, through inter-frame structural line matching, the present disclosure can also be used for robot visual positioning and navigation under the low-texture and low illumination environment.

Figure 5:
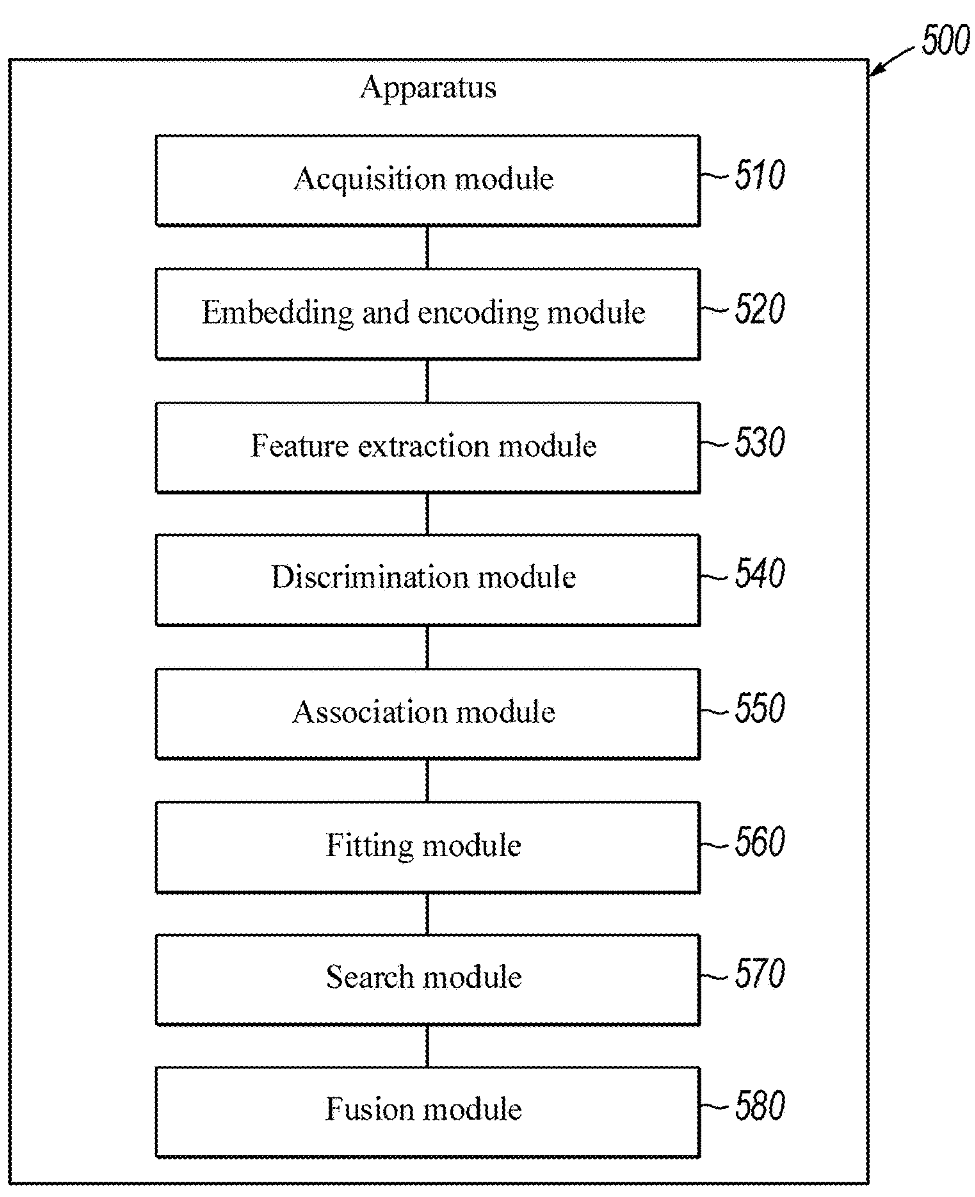
FIG. 5 is a block diagram of an apparatus for constructing a structural semantic map under an underground weak-light and low-texture environment according to an embodiment of the present disclosure.

FIG. 5 is a block diagram of an apparatus 500 for constructing a structural semantic map under an underground weak-light and low-texture environment according to an exemplary embodiment. The apparatus 500 is used in the method for constructing a structural semantic map under an underground weak-light and low-texture environment. The apparatus 500 includes an acquisition module 510, an embedding and encoding module 520, a feature extraction module 530, a discrimination module 540, an association module 550, a fitting module 560, a search module 570, and a fusion module 580.

The acquisition module 510 is configured to acquire, by a sensor based on vision and three-dimensional depth perception, multi-modal perception information of a target scene, where the multi-modal perception information includes a Red-Green-Blue (RGB) visual image and depth perception information, and the depth perception information includes an ordered point cloud and a disordered point cloud.

The embedding and encoding module 520 is configured to acquire a regular parameterized line set of the visual image through an Ellipse and Line Segment Detector with Continuous validation (ELSDc), and embed and encode the line segments and ellipse arcs in the regular parameterized line set to obtain an embedding vector with a length of 256 dimensions.

The feature extraction module 530 is configured to perform visual feature extraction on the visual images through an image feature extraction module.

The discrimination module 540 is configured to input the embedding vector and the visual features into a trained parameterized line discrimination network model to obtain a structural semantic line set.

The association module 550 is configured to preprocess the ordered point cloud and the disordered point cloud in the depth perception information, and associate two-dimensional structural lines in the structural semantic line set with the pixels of the visual image by indexing the structural semantic line segments of the ordered point cloud and the disordered point cloud and the passed pixels, to obtain the association relationship between the two-dimensional structural lines and the three-dimensional points.

The fitting module 560 is configured to perform three-dimensional space fitting on the two-dimensional structural lines based on the association relationship between the two-dimensional structural lines and the three-dimensional points to obtain three-dimensional structural lines.

The search module 570 is configured to perform geometric primitive half-plane search based on the three-dimensional structural lines, and determine whether the point clouds on both sides of each three-dimensional structural line satisfy a constraint of a regular surface, if so, perform geometric primitive neighborhood expansion according to a greedy algorithm, and determine a maximum regular area.

The fusion module 580 is configured to fuse the determined maximum regular area with the point cloud set to construct structural map data.

In the embodiment of the present disclosure, multi-modal perception information of a target scene is acquired; a regular parameterized line set of the visual image is acquired through the ELSDc; the line segments and ellipse arcs in the regular parameterized line set are embedded and encoded to obtain an embedding vector; visual feature extraction is performed on the visual image through an image feature extraction module; the embedding vector and the visual features are input into a trained parameterized line discrimination network model to obtain a structural semantic line set; the ordered point cloud and the disordered point cloud in the depth perception information are preprocessed, and two-dimensional structural lines in the structural semantic line set are associated with the pixels of the visual image by indexing the structural semantic line segments of the ordered point cloud and the disordered point cloud and the passed pixels, so as to obtain the association relationship between the two-dimensional structural lines and the three-dimensional points; three-dimensional space fitting is performed on the two-dimensional structural lines based on the association relationship between the two-dimensional structural lines and the three-dimensional points to obtain three-dimensional structural lines; geometric primitive half-plane search is performed based on the three-dimensional structural lines, and it is determined whether the point clouds on both sides of each three-dimensional structural line satisfy a constraint of a regular surface, if so, geometric primitive neighborhood expansion is performed according to a greedy algorithm, and a maximum regular area is determined; and the determined maximum regular area is fused with the point cloud set to construct structural map data.

Compared with the structure identification and enhancement method based on point cloud fitting, the present disclosure uses the image and point cloud information at the same time, and extracts the structural semantic lines as clues to discover regular structures. On the one hand, the present disclosure reduces the risk of inaccuracy in the huge amount of calculation from segmentation to fitting of point clouds. On the other hand, compared with a series of methods based on image feature points, according to the structural line identification and judgment method provided by the present disclosure, various underground spatial three-dimensional maps can be established under the weak-light and low-texture environment without manual intervention, and a complete CAD operational model is established for regular objects such as pipelines, columns and stairs, so that the method can work well even in underground spaces with poor light and lack of texture, such as urban underground pipe corridors, subway underground tunnels and various weak-light and low-texture environments, and can solve the problems of a long manual modeling period, a low three-dimensional modeling precision under low-texture and weak-light and so on. In addition, through inter-frame structural line matching, the present disclosure can also be used for robot visual positioning and navigation under the low-texture and low illumination environment.

Figure 6:
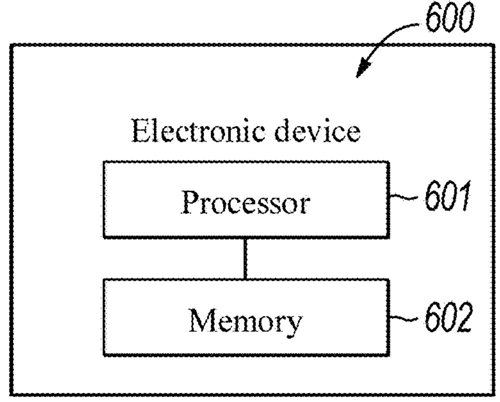
FIG. 6 is a schematic structural diagram of an electronic device according to an embodiment of the present disclosure.

FIG. 6 is a schematic structural diagram of an electronic device 600 according to an embodiment of the present disclosure. The electronic device 600 may be quite different due to different configurations or performances, and may include one or more central processing units (CPUs) 601 and one or more memories 602, where at least one instruction is stored in the memory 602, and the at least one instruction is loaded and executed by the processor 601 to implement the steps of the above method.

In an exemplary embodiment, there is further provided a computer-readable storage medium, such as a memory including instructions. The instructions can be executed by a processor in a terminal to complete the above method. For example, the computer-readable storage medium can be a Read-Only Memory (ROM), a Random Access Memory (RAM), a CD-ROM, a magnetic tape, a floppy disk and an optical data storage device.

The above should be understood to be only one preferred embodiment of the present disclosure, rather than limiting the present disclosure. Any modification, equivalent substitution, improvement, etc. made within the spirit and principle of the present disclosure should be included in the scope of protection of the present disclosure.

Those skilled in the art can understand that all or part of the steps implementing the above-mentioned embodiment can be completed by hardware, or completed by instructing related hardware through a program. The program can be stored in a computer-readable storage medium. The above-mentioned storage medium can be a read-only memory, a magnetic disk or an optical disk, etc.

What is claimed is:

1. A method for constructing a structural semantic map under an underground weak-light and low-texture environment, comprising:

- S1, acquiring, by a sensor based on vision and three-dimensional depth perception, multi-modal perception information of a target scene, wherein the multi-modal perception information comprises a Red-Green-Blue (RGB) visual image and depth perception information, and the depth perception information comprises an ordered point cloud and a disordered point cloud;
- S2, acquiring a regular parameterized line set of the visual image through an Ellipse and Line Segment Detector with Continuous validation (ELSDc), and embedding and encoding line segments and ellipse arcs in the regular parameterized line set to obtain an embedding vector with a length of 256 dimensions;
- S3, performing visual feature extraction on the visual image through an image feature extraction module;
- S4, inputting the embedding vector and visual features into a trained parameterized line discrimination network model to obtain a structural semantic line set;
- S5, preprocessing the ordered point cloud and the disordered point cloud in the depth perception information, and associating two-dimensional structural lines in the structural semantic line set with pixels of the visual image by indexing structural semantic line segments of the ordered point cloud and the disordered point cloud and passed pixels, to obtain an association relationship between the two-dimensional structural lines and three-dimensional points;
- S6, performing three-dimensional space fitting on the two-dimensional structural lines based on the association relationship between the two-dimensional structural lines and the three-dimensional points, to obtain three-dimensional structural lines;
- S7, performing geometric primitive half-plane search based on the three-dimensional structural lines, and determining whether point clouds on both sides of each three-dimensional structural line satisfy a constraint of a regular surface, if so, performing geometric primitive neighborhood expansion according to a greedy algorithm, and determining a maximum regular area; and
- S8, fusing the determined maximum regular area with a point cloud set to construct structural map data.

2. The method according to claim 1, wherein the acquiring a regular parameterized line set of the visual image through an ELSDc in S2 comprises:

S21, acquiring the regular parameterized line set {L, A} of the visual image through the ELSDc, wherein {L, A} is shown in a formula (1):

$$\{L, A\} = ELSDc\,(I_{rgb}) \tag{1}$$
$$L_i = \{(x_{1i}, y_{1i}, x_{2i}, y_{2i}) | i = 1, 2, \ldots N\}$$
$$A_i = \{(a_j, b_j, x_{1j}, y_{1j}, \theta_j, \varphi_j^{start}, \varphi_j^{end}) | j = 1, 2, \ldots M\}$$

wherein $I_{rgb}$ denotes the visual image, $(x_{1i}, y_{1i}, x_{2i}, y_{2i})$ denote parameters of a i-th line segment, $x_{1i}$ and $y_{1i}$ denote two-dimensional coordinates of one end point of the i-th line segment, $x_{2i}$ and $y_{2i}$ denote two-dimensional coordinates of another end point of the i-th line segment, N denotes a total number of line segments, $$(a_j, b_j, x_{1j}, y_{1j}, \theta_j, \varphi_j^{start}, \varphi_j^{end})$$

denote parameters of a j-th ellipse arc, $x_{1j}$ and $y_{1j}$ denote two-dimensional coordinates of a center point of the ellipse arc, $a_j$ and $b_j$ denote semi-axis lengths of long and short axes, respectively, $\theta_j$ denotes a rotation angle, $$\varphi_j^{start}$$

denotes a starting point angle, $$\varphi_j^{end}$$

denotes a ending point angle, and M denotes a total number of ellipse arcs.

3. The method according to claim 2, wherein the embedding and encoding line segments and ellipse arcs in the regular parameterized line set to obtain an embedding vector with a length of 256 dimensions in S2 comprises:

S22, according to a following formula (2), using two different encoders, respectively, to embed and encode the line segments and the ellipse arcs, and after encoding, outputting a vector with a length of 256 dimensions:

$$F_L^i = LineEncoder(L_i) \quad (2)$$
$$F_A^i = ArcEncoder(A_i)$$

wherein LineEncoder( ) denotes a line segment position encoder, $L_i$ denotes the i-th line segment, ArcEncoder( ) denotes an arc position encoder, and $A_i$ denotes an i-th ellipse arc.

4. The method according to claim 1, wherein the image feature extraction module is Resnet-50; and the performing visual feature extraction on the visual image through an image feature extraction module in S3 comprises:

inputting the visual image into the Resnet-50, performing position embedding on a scale of the visual image by using a sin position encoder and a cos position encoder, and splicing a position embedding vector with the visual image to obtain the visual features of the visual image.

5. The method according to claim 4, wherein the preprocessing the ordered point cloud and the disordered point cloud in the depth perception information in S5 comprises:

for an optimal precision range of the sensor, preprocessing the depth perception information by using a pass-through filter and a conditional filter, and extracting an effective perception area of the sensor;

for the ordered point cloud in the depth perception information, using a bilateral filter to denoise a surface of a spatial three-dimensional model; for the disordered point cloud in the depth perception information, using a Gaussian filter to perform smooth denoising; and for a cloud outlier, using a statistical filter for removal.

6. The method according to claim 1, wherein a parameterized line discrimination network model is a Transformer model; and a training process of the parameterized line discrimination network model comprises:

by using a differentiable renderer, with a discriminant probability as a transparency value and line parameters as line drawing constraints, performing L2-loss on a rendered image and a binary image semantically labeled by a real structure, to train the parameterized line discriminant network model.

7. The method according to claim 1, wherein the associating two-dimensional structural lines in the structural semantic line set with pixels of the visual image by indexing structural semantic line segments of the ordered point cloud and the disordered point cloud and passed pixels, to obtain an association relationship between the two-dimensional structural lines and three-dimensional points in S5 comprises:

for each structural line corresponding to the ordered point cloud, associating indexes of all pixel points passed by the structural lines with indexes of the line segments, and establishing a set of three-dimensional coordinate points covered by the line segments;

for the disordered point cloud, using the sensor to calibrate a parameter, establishing a corresponding relationship between pixel points in an image coordinate system and three-dimensional points of the disordered point cloud, associating indexes of all pixel points passed by each structural line corresponding to the disordered point cloud with the indexes of the line segments, and establishing a set of three-dimensional coordinate points covered by the line segments.

8. The method according to claim 1, wherein the performing geometric primitive half-plane search based on the three-dimensional structural lines, and determining whether point clouds on both sides of each three-dimensional structural line satisfy a constraint of a regular surface in S7 comprises:

for the line segments in the three-dimensional structural lines, using a plane and a cylindrical surface for performing parameter fitting at the same time on two parts on both sides of the line segment, and in a case that any part on both sides of the line segment conforms to a fitting of the plane or the cylindrical surface, determining that the point clouds on both sides of the line segment satisfy the constraint of the regular surface, in which there are corresponding regular geometric primitives; and for the ellipse arcs in the three-dimensional structural lines, using the plane for performing parameter fitting on a part located inside the ellipse arc, and in a case that there is a three-dimensional point cloud distribution conforming to the plane, determining that the point cloud inside an arc satisfies the constraint of the regular surface, in which, the geometric primitive inside the ellipse arc is a plane; and for a part outside the ellipse arc, using the cylindrical surface for parameter fitting, and in a case that there is a three-dimensional point cloud distribution conforming to the plane, determining that the point cloud outside the arc satisfies the constraint of the regular surface, in which, the geometric primitive outside the ellipse arc is a cylindrical surface.

9. An apparatus for constructing a structural semantic map under an underground weak-light and low-texture environment, comprising:

a sensor configured to acquire, based on vision and three-dimensional depth perception, multi-modal perception information of a target scene, wherein the multi-modal perception information comprises a Red-Green-Blue (RGB) visual image and depth perception information, and the depth perception information comprises an ordered point cloud and a disordered point cloud;

a processor; and a memory having programming instructions stored thereon, which, when executed by the processor, cause the processor to:

acquire a regular parameterized line set of the visual image through an Ellipse and Line Segment Detector with Continuous validation (ELSDc), and embed and encode line segments and ellipse arcs in the regular parameterized line set to obtain an embedding vector with a length of 256 dimensions;

perform visual feature extraction on the visual image through an image feature extraction module;

input the embedding vector and visual features into a trained parameterized line discrimination network model to obtain a structural semantic line set;

preprocess the ordered point cloud and the disordered point cloud in the depth perception information, and associate two-dimensional structural lines in the structural semantic line set with pixels of the visual image by indexing structural semantic line segments of the ordered point cloud and the disordered point cloud and passed pixels, to obtain an association relationship between the two-dimensional structural lines and three-dimensional points;

perform three-dimensional space fitting on the two-dimensional structural lines based on the association relationship between the two-dimensional structural lines and the three-dimensional points to obtain three-dimensional structural lines;

perform geometric primitive half-plane search based on the three-dimensional structural lines, and determine whether point clouds on both sides of each three-dimensional structural line satisfy a constraint of a regular surface, if so, perform geometric primitive neighborhood expansion according to a greedy algorithm, and determine a maximum regular area; and fuse the determined maximum regular area with a point cloud set to construct structural map data.

10. The apparatus according to claim 9, wherein acquiring the regular parameterized line set of the visual image performed by the processor further comprises:

acquiring the regular parameterized line set {L, A} of the visual image through the ELSDc, wherein {L, A} is shown in a formula (1):

$$\{L, A\} = ELSDc(I_{rgb}) \tag{1}$$

$$L_i = \{(x_{1i}, y_{1i}, x_{2i}, y_{2i}) | i = 1, 2, \ldots N\}$$

$$A_i = \{(a_j, b_j, x_{1j}, y_{1j}, \theta_j, \varphi_j^{start}, \varphi_j^{end}) | j = 1, 2, \ldots M\}$$

wherein $I_{rgb}$ denotes the visual image, $(x_{1i}, y_{1i}, x_{2i}, y_{2i})$ denote parameters of a i-th line segment, $x_{1i}$ and $y_{1i}$ denote two-dimensional coordinates of one end point of the i-th line segment, $x_{2i}$ and $y_{2i}$ denote two-dimensional coordinates of another end point of the i-th line segment, N denotes a total number of line segments, $$(a_j, b_j, x_{1j}, y_{1j}, \theta_j, \varphi_j^{start}, \varphi_j^{end})$$

denote parameters of a j-th ellipse arc, $x_{1i}$ and $y_{1i}$ denote two-dimensional coordinates of a center point of the ellipse arc, $a_j$ and $b_j$ denote semi-axis lengths of long and short axes, respectively, $\theta_j$ denotes a rotation angle, $$\varphi_j^{start}$$

denotes a starting point angle, $$\varphi_j^{end}$$

denotes a ending point angle, and M denotes a total number of ellipse arcs.

* * * * *